(12) United States Patent
Miller et al.

(10) Patent No.: US 9,854,738 B2
(45) Date of Patent: Jan. 2, 2018

(54) STRING TRIMMER WITH ADJUSTABLE GUARD ASSEMBLY

(71) Applicant: BLACK & DECKER, INC., Newark, DE (US)

(72) Inventors: Mark D Miller, Towson, MD (US); Michael Cannaliato, Bel Air, MD (US)

(73) Assignee: Black & Decker, Inc., Newark, DE (US)

( * ) Notice: Subject to any disclaimer, the term of this patent is extended or adjusted under 35 U.S.C. 154(b) by 46 days.

(21) Appl. No.: 14/713,671

(22) Filed: May 15, 2015

(65) Prior Publication Data
US 2016/0330903 A1 Nov. 17, 2016

(51) Int. Cl.
*A01D 34/416* (2006.01)
*A01D 34/90* (2006.01)

(52) U.S. Cl.
CPC ......... *A01D 34/4167* (2013.01); *A01D 34/90* (2013.01)

(58) Field of Classification Search
CPC .......................... A01D 34/416; A01D 34/4167
USPC .............................. D8/8; 30/276; 56/12.7, 17
See application file for complete search history.

(56) References Cited

U.S. PATENT DOCUMENTS

| | | | | |
|---|---|---|---|---|
| 4,145,809 A | * | 3/1979 | Proulx | A01D 34/416 30/276 |
| 4,501,332 A | * | 2/1985 | Straayer | A01B 1/065 30/276 |
| 4,651,422 A | * | 3/1987 | Everts | A01D 34/4167 D8/8 |
| 4,864,728 A | * | 9/1989 | Kloft | A01D 75/206 30/276 |
| 5,048,187 A | * | 9/1991 | Ryan | A01D 75/206 30/276 |
| 5,060,383 A | * | 10/1991 | Ratkiewich | A01D 34/4167 30/276 |
| 5,077,898 A | * | 1/1992 | Hartwig | A01D 34/90 30/276 |
| 5,351,403 A | * | 10/1994 | Becker | A01D 34/416 30/276 |

(Continued)

FOREIGN PATENT DOCUMENTS

| | | |
|---|---|---|
| CN | 104770142 A | 7/2015 |
| DE | 42 37 357 A1 | 5/1994 |

(Continued)

OTHER PUBLICATIONS

Extended European Search Report dated Mar. 17, 2017 for EP Appl. No. 16169411.9.

(Continued)

*Primary Examiner* — Jason Daniel Prone
(74) *Attorney, Agent, or Firm* — Kramer Amado, P.C.

(57) ABSTRACT

The adjustable guard assembly is connected to a head assembly of a string trimmer. The adjustable guard assembly includes a housing. The housing includes a mounting portion, which connects to a motor case. The housing further includes a deck portion, which extends from the mounting portion. The deck portion has a proximal end and a distal end. A first skirt member extends along and downward from the distal end of the deck portion in a generally radially outward direction. A first blade assembly includes a first blade member, provided in the interior of the first skirt member, to engage a rotating string member.

13 Claims, 8 Drawing Sheets

(56) References Cited

U.S. PATENT DOCUMENTS

| | | | | |
|---|---|---|---|---|
| 5,385,005 A * | 1/1995 | Ash | A01D 34/84 56/12.7 |
| D357,616 S * | 4/1995 | Hintze | D8/8 |
| 5,402,627 A * | 4/1995 | Trompler | A01D 34/90 56/12.7 |
| 5,423,126 A * | 6/1995 | Byrne | A01D 34/84 30/276 |
| 5,493,784 A * | 2/1996 | Aiyama | A01D 75/20 30/276 |
| 5,584,348 A * | 12/1996 | Butler | A01D 75/206 30/276 |
| 5,651,418 A * | 7/1997 | Jerez | A01D 34/416 30/276 |
| D382,779 S * | 8/1997 | Meisner | D8/8 |
| D382,780 S * | 8/1997 | Meisner | D8/8 |
| 5,813,122 A * | 9/1998 | Mubareka | A01D 43/14 30/276 |
| 5,839,262 A * | 11/1998 | Sorensen | A01D 34/001 30/276 |
| 5,996,234 A * | 12/1999 | Fowler | A01D 34/90 30/276 |
| 6,052,976 A * | 4/2000 | Cellini | A01D 34/4167 30/276 |
| 6,327,782 B1 * | 12/2001 | Blevins | A01D 34/4167 30/276 |
| 6,658,741 B2 * | 12/2003 | Paluszek | A01D 75/185 30/276 |
| 6,742,263 B2 * | 6/2004 | Ellson | A01D 34/4163 30/276 |
| 6,751,871 B2 * | 6/2004 | Furnish | A01D 43/063 30/276 |
| 6,757,980 B2 * | 7/2004 | Arsenault | A01D 75/206 30/276 |
| 6,842,985 B2 * | 1/2005 | Richardson | A01D 34/4167 30/276 |
| 6,892,461 B2 * | 5/2005 | Peterson | A01D 34/4167 30/276 |
| 7,284,331 B2 * | 10/2007 | Paddock | A01D 34/828 30/276 |
| 7,406,771 B2 * | 8/2008 | Zimmermann | A01D 34/4167 30/276 |
| D584,581 S * | 1/2009 | Bradford | D8/8 |
| D599,632 S * | 9/2009 | Bradford | D8/8 |
| D628,034 S * | 11/2010 | Albertson | D8/8 |
| 7,836,602 B2 * | 11/2010 | Langhans | A01D 34/826 30/276 |
| 7,963,041 B1 * | 6/2011 | Smith | A01D 34/416 30/347 |
| D645,313 S * | 9/2011 | Albertson | D8/8 |
| 8,256,120 B2 * | 9/2012 | Million | A01D 34/416 30/278 |
| 8,590,166 B1 * | 11/2013 | Albertson | A01D 75/206 30/276 |
| D712,213 S * | 9/2014 | Hattori | D8/8 |
| 8,984,711 B2 | 3/2015 | Ota et al. | |
| 9,433,146 B2 * | 9/2016 | Hutchins | A01D 34/4167 30/276 |
| 2004/0148783 A1 * | 8/2004 | Cashman | A01D 34/416 30/276 |
| 2005/0183269 A1 * | 8/2005 | Thompson | A01D 34/828 30/276 |
| 2006/0123635 A1 * | 6/2006 | Hurley | A01D 34/4163 30/276 |
| 2008/0196254 A1 * | 8/2008 | Bessinger | A01D 34/416 30/276 |
| 2009/0271992 A1 * | 11/2009 | Holter | A01D 34/4161 30/276 |
| 2011/0277328 A1 * | 11/2011 | Hurley | A01D 34/81 30/286 |
| 2013/0031788 A1 * | 2/2013 | Ohno | A01D 34/90 30/276 |
| 2015/0230402 A1 * | 8/2015 | Grande | A01D 34/4167 30/276 |
| 2016/0262306 A1 * | 9/2016 | Macedonio | A01D 34/4167 30/276 |
| 2016/0336557 A1 * | 11/2016 | Miller | A01D 34/416 30/276 |
| 2016/0345492 A1 * | 12/2016 | Miller | A01D 34/416 30/276 |

FOREIGN PATENT DOCUMENTS

| | | | |
|---|---|---|---|
| EP | 0 707 786 A1 | 4/1996 | |
| EP | 2 044 829 A1 | 4/2009 | |
| EP | 3092884 A2 * | 11/2016 | A01D 34/4167 |
| WO | 2011/005156 A1 | 1/2011 | |
| WO | 20140119175 A1 | 8/2014 | |
| WO | 20140119181 A1 | 8/2014 | |
| WO | WO 2015176736 A1 * | 11/2015 | A01D 34/4167 |

OTHER PUBLICATIONS

"European Search Report for European Applicaion No. 16161714.7-1655".

* cited by examiner

STRING TRIMMER WITH ADJUSTABLE GUARD ASSEMBLY

TECHNICAL FIELD

The present invention relates to a string trimmer having a guard assembly. More particularly, the invention relates to a string trimmer having an adjustable guard assembly, configured to permit a user to selectively operate the guard assembly in a variety of modes and sizes.

BACKGROUND

Conventional string trimmers are generally used for horizontal trimming and vertical edging of lawn. Typically, string trimmers include a handle, a motor, an elongated shaft and a lower cutting head from which the string cutting element extends and rotates to cut grass, weeds, and other vegetation. The motor is generally provided at a lower end of the elongated shaft and actuated by a trigger provided in the handle assembly. String trimmers may be powered by combustible fuel engines or electric motors. Electric motor driven string trimmers may be connected to a line source such as 120 volt alternating current electric power, or they may be powered by a battery pack or other source of direct current electrical power.

Most string trimmers include a string trimmer guard assembly, which is configured to deflect debris traveling rearwardly away from the housing, towards the ground, or to the sides of the trimmer housing. When operated in connection with flexible string trimmers, the guard assembly may also include a cutting element such as a blade to automatically trim the cutting element to a proper length while the string rotates within the trimmer guard. String trimmers are used by a wide variety of users, ranging from commercial use to home use. Accordingly, users have a variety preferences with respect to the size of guard assembly connected to the string trimmer, as well as whether to operate with or without a guard assembly.

In general, most string trimmers provide the user with only one size option for the guard assembly. Accordingly, the user may select that string trimmer size based on the size of the guard, or the user may have to purchase an additional guard assembly, and disassemble the string trimmer to replace the guard assembly. Conventional string trimmers have not provided a solution to provide the user with a guard assembly with an adjustable size. Further, conventional string trimmers do not provide a solution for trimming the cutting element when the guard assembly and attached blade, is removed by the user

SUMMARY OF THE INVENTION

In light of the present need for a string trimmer with an adjustable guard assembly, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

The guard assembly, connected to a head assembly of a string trimmer includes a housing including a mounting portion having an aperture formed therein for connection to a motor case. The housing further includes a deck portion extending from the mounting portion. The deck portion has a proximal end and a distal end with a first skirt member extends along and substantially downward from the distal end of the deck in a generally radially outward direction. The housing further includes a first blade assembly including a first blade provided in the interior of the first skirt member to engage a rotating string member.

In one embodiment of the guard assembly, the mounting portion has a slit formed therethrough permitting the guard assembly to be removed and attached to a motor case without removing a cutting head.

In another embodiment of the guard assembly, the mounting portion has two detachable parts, permitting the guard assembly to be removed from the motor case without removing the cutting head.

In another embodiment of the guard assembly, the guard assembly further includes a second blade assembly including a support member extending substantially downward, and a second blade attached to the support member.

In another embodiment of the guard assembly, the deck portion includes a second aperture configured to receive the second blade assembly therethrough. The second aperture extends generally from the proximal end to the distal end of the deck portion.

In another embodiment of the guard assembly, a second skirt member is configured for operative engagement with the first skirt member In yet another embodiment of the guard assembly, the second skirt member is connected at a pivot point to facilitate pivotable movement of the second skirt member from an open position to a closed retracted position relative to first skirt member.

In yet another embodiment of the guard assembly, the second skirt member is removably connected to an outer edge of the first skirt member, such that in a connected position the first skirt member and second skirt member form a third skirt member.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

To facilitate understanding, identical reference numerals have been used to designate elements having substantially the same or similar structure and/or substantially the same or similar function

DETAILED DESCRIPTION OF THE INVENTION

Figure 1:
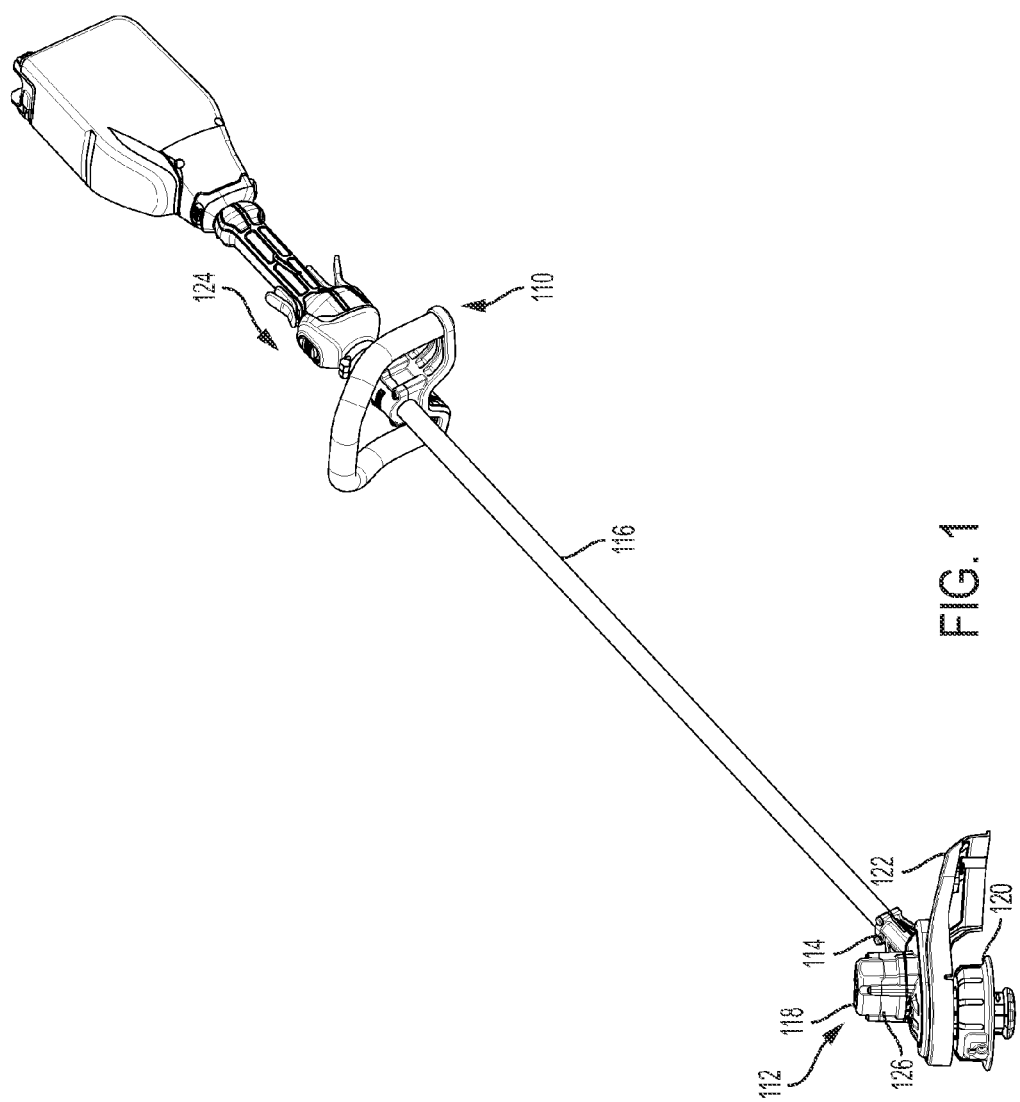
FIG. 1 is a perspective view of a string trimmer including an adjustable string trimmer guard assembly.

The present disclosure provides a string trimmer guard assembly configured for use in connection with a conventional string trimmer. As previously discussed, most string trimmers are outfitted with a fixed string trimmer guard assembly with a blade affixed therein. The one-size guard assembly limits the variety of desired user guard size options. Further, by providing the blade within the guard, removal of the guard by the user, unfortunately removes the blade as well. Accordingly, it is desirable to provide a removable string trimmer guard assembly that has an adjustable skirt size, which permits a user to adjust the skirt to fit the needs of the user. It is further desirable that the string trimmer guard assembly provide a second blade member that permits string element cutting, when the user removes the guard and its connected first blade member.

The foregoing advantages of the invention are illustrative of those that can be achieved by the various exemplary embodiments and are not intended to be exhaustive or limiting of the possible advantages which can be realized. Thus, these and other advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

The string trimmer 110 generally includes a head assembly 112 connected to a distal end 114 of a support shaft 116, and a handle assembly 124 provided on the support shaft 116 to allow a user to control on and off operation of the head assembly 112. The head assembly 112 may include a motor case 118, a motor 126 enclosed in the motor case 18, and a rotary cutting head 120 which is operatively connected to the motor 126.

The cutting head 120 includes at least one string cutting element, which is configured to extend radially from the cutting head 120, and rotate through a circular path. The string trimmer 110 further includes a guard assembly 122 which is positioned generally intermediate to the motor case 118 and cutting head 120, to prevent debris from flying at the user during operation.

Figure 2:
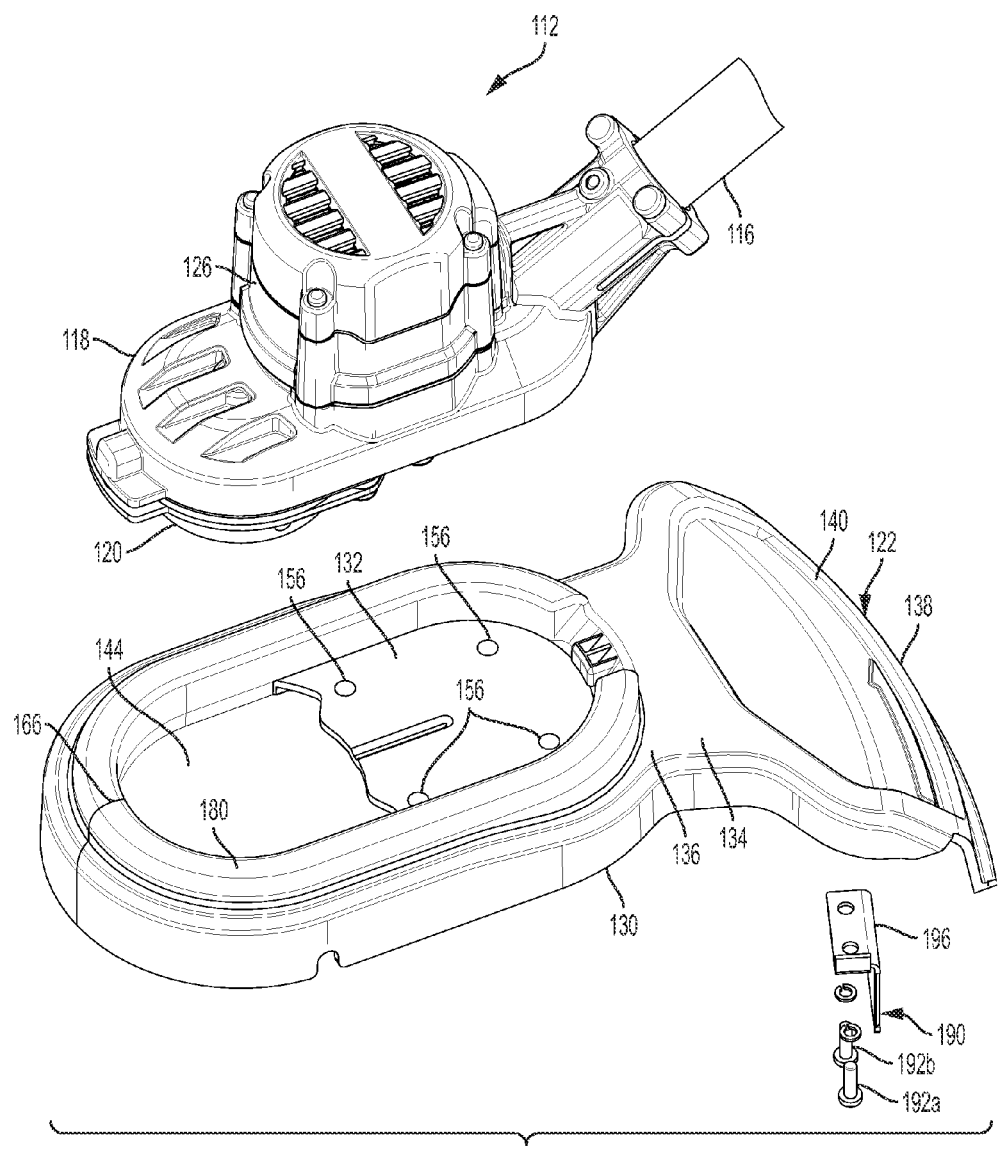
FIG. 2 is an exploded perspective view of the adjustable string trimmer guard assembly of FIG. 1.

As shown in FIG. 2, the head assembly 112 includes a guard assembly 122 configured for removable connection to the motor case 118. The guard assembly 122 generally includes a housing 130 comprised of a plastic, polyurethane, or polymer, for example. The housing 130 includes a mounting portion 132, having a generally oblong shape, configured for removable connection to the motor case 118. The housing 130 further includes a deck portion 134 that extends in generally radially outward direction from the mounting portion 132.

As shown, the deck portion 134 extends between a first end portion 136 and a second end portion 138, and tapers from narrow to wide along a direction from the first end portion 136 towards the second end portion 138. The second end portion 138 has a generally arcuate shape defining a skirt member 140 configured to cover a portion of the circular path of the string cutting element as it moves generally below the deck portion 134 during its rotation.

Figure 3:
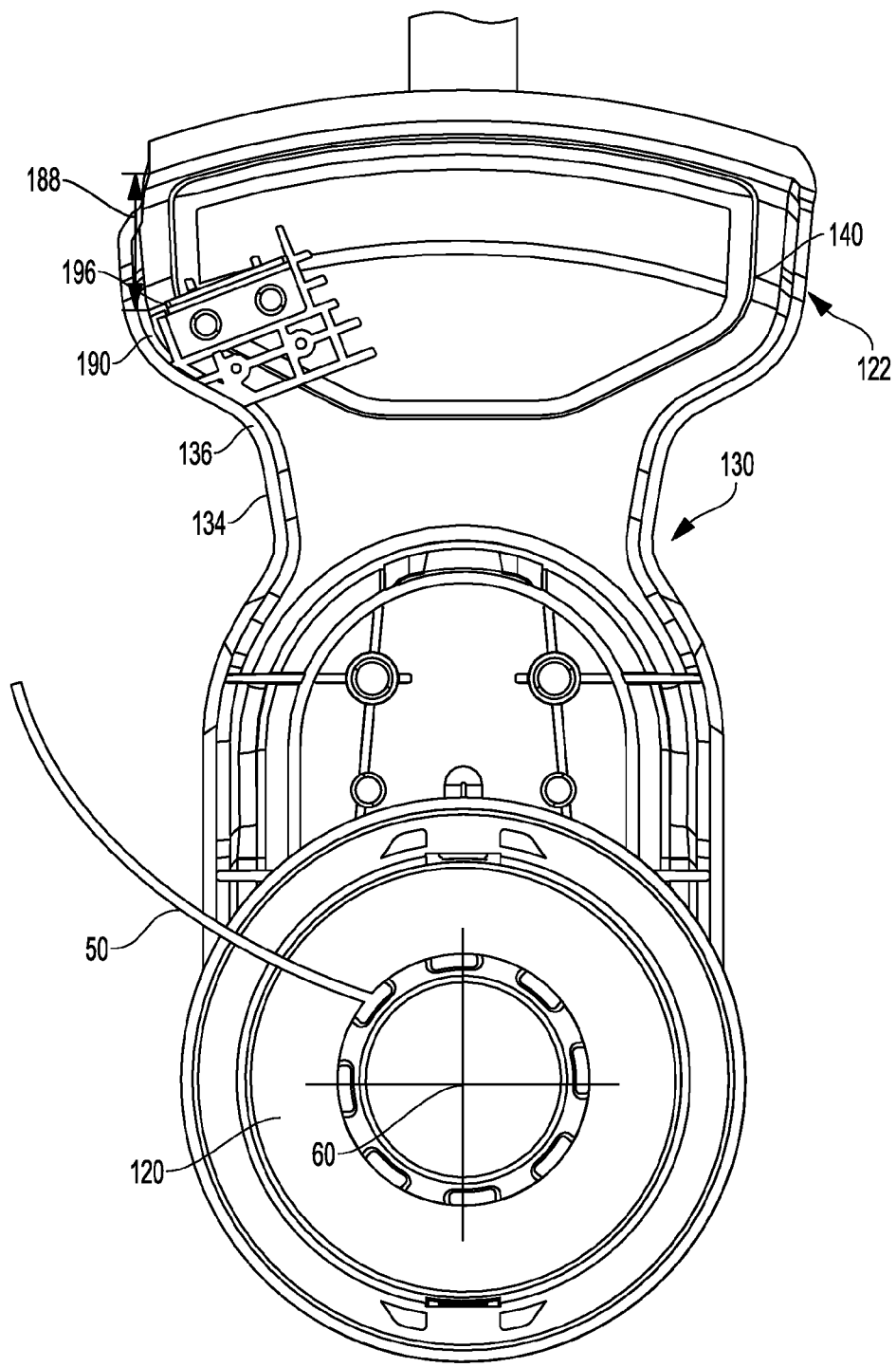
FIG. 3 is a bottom view of the adjustable guard assembly of FIG. 1.

As further illustrated in FIG. 3, the guard assembly 122 extends partially around the path of the string cutting element 50. As illustrated, at least a portion of that path of the string cutting element 50 is exposed, thereby allowing the string cutting element 50 to engage and slice objects in its path as it rotates about an axis 60.

The skirt member 140 extends in a substantially downward direction from the deck 134. As shown, the skirt member 140 extends along and downward from the deck portion 134. The skirt member 140 covers the end of the string cutting element 50 during its rotation below deck portion 134, and prevents debris from flying radially outwardly from below the deck portion 134.

As shown in FIG. 2, the mounting portion 132 is at an end 136 of the deck portion 134. The mounting portion 132 is configured to secure the string trimmer guard assembly 122 to the string trimmer motor case 118, with portion of a cutting head 120 extending through an opening 144. One of ordinary skill in the art will appreciate the particular configuration of mounting portion 132 can be varied in accordance with various guard mounting structures provided by various string trimmers.

In this embodiment, the guard assembly 122 is configured for removal from the motor case 118 without requiring removal of the cutting head 120. In this configuration, the guard assembly 122 may be formed with a separable portion or seam 166 formed along the outer edge, permitting the separation of the outer edge, and thus allowing the guard assembly 122 to be removed without removal of the cutting head 120.

Figure 9:
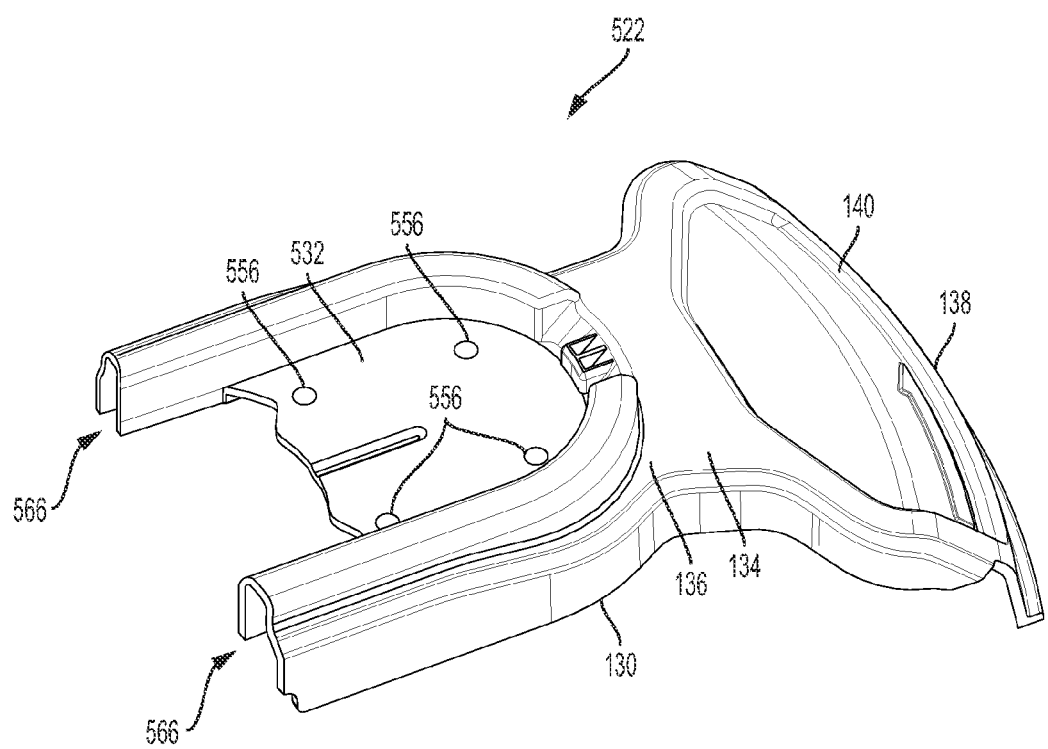

In an alternate embodiment shown in FIG. 9, it is contemplated that the guard assembly 522 may be provided as a generally half structure, such as a half-oblong structure, with a first and second open end portion 566. As such, the mounting portion 532 and apertures 556 permit the guard assembly 522 to be easily removed from the motor case 118 and cutting head 120 by removing the fasteners, without removing the motor case 118.

Now referring back to FIG. 2, a plurality of mounting apertures 156 are spaced at generally equal intervals, through which threaded bolts may be passed and threadably received to secure the guard assembly 122 to the motor case 118. The guard assembly 122 further comprises a reinforcement rim 180, which extends around the mounting portion 132 around the perimeter thereof.

A first blade assembly 190 can be seen, for example, in FIGS. 2 and 3 and is positioned such that the cutting edge of the blade 196 is transverse to the string cutting element and extends generally vertically along the inward side of skirt member 140. The blade 196 is connected to the interior of the skirt member 140 by fasteners 192a, 192b. In an aspect, blade 196 may be inwardly disposed in a radially direction from an edge of the skirt member 140 forming a gap 188 between the blade 196 and the skirt member 140. The gap 188 permits air to flow between the blade 196 and the skirt member 140, and prevents slack in the string cutting element 50. Additionally, while the blade 196 is shown in a generally straight configuration, one skilled in the art will appreciate it may take other forms, such as slanted or curved.

As previously indicated, in some circumstances, a user may prefer to operate the string trimmer without a guard assembly connected thereto, to facilitate cutting precision on an object in a tight space. In such cases, removal of the guard assembly would also remove the blade connected internally to the guard assembly, which would allow the cutting element to extend indefinitely, leading to dangerous lengths that could harm the user. Further, in this case, the string cutting element 50 may be free to rotate at any length, increasing the torque loading on the motor, and possibly lead to motor burn out.

Figure 4:
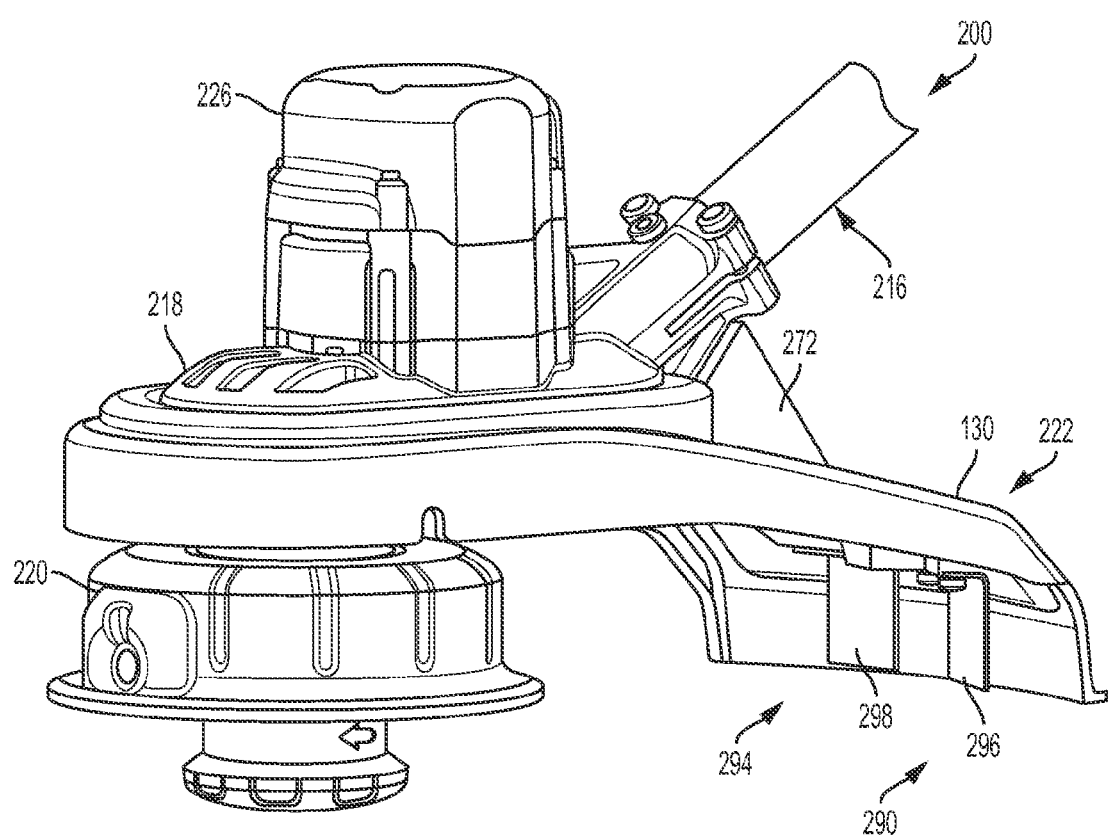
FIG. 4 is a side perspective view of an embodiment of the string trimmer guard assembly, illustrating a first blade assembly and a second blade assembly connected thereto.
Figure 5:
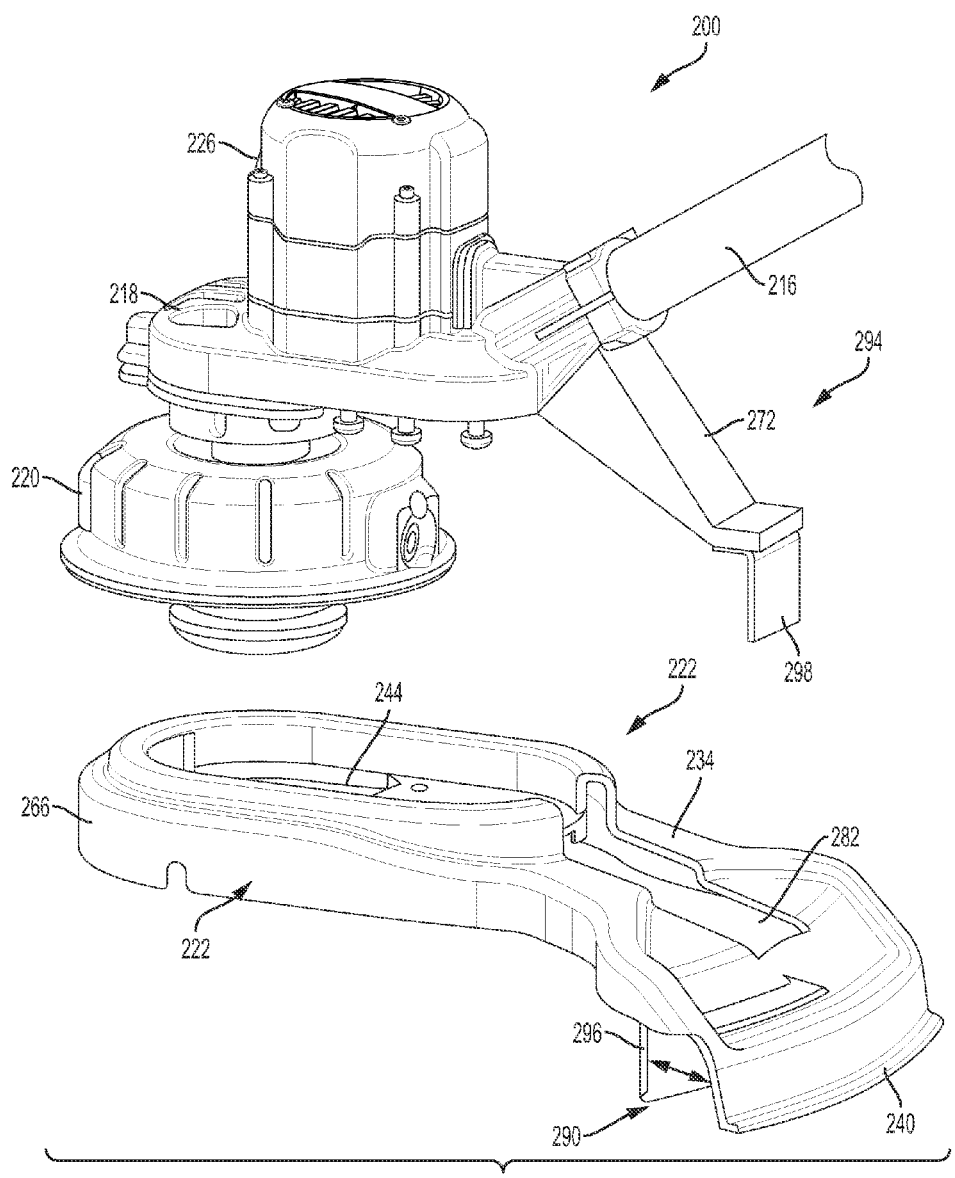
FIG. 5 is an exploded perspective view of an embodiment of the string trimmer guard assembly of FIG. 4.
Figure 6:
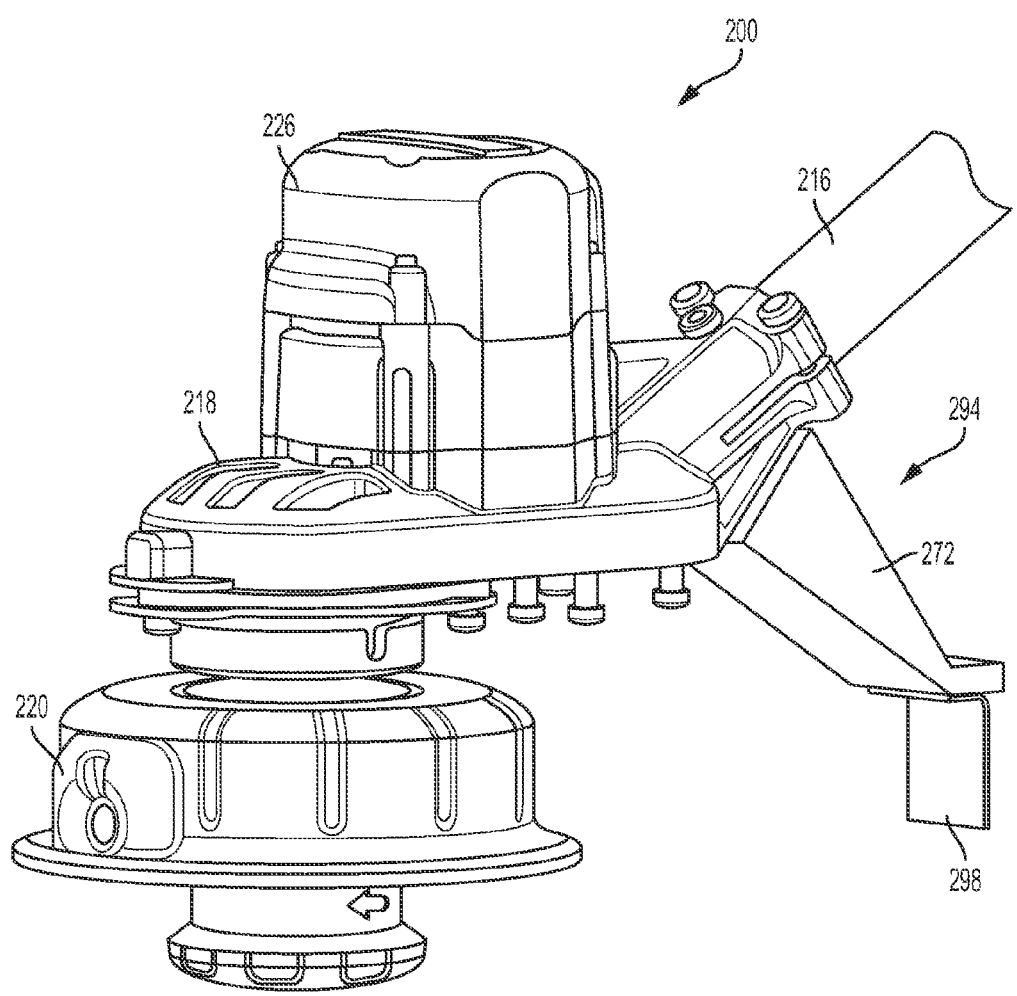
FIG. 6 is perspective view of the string trimmer guard assembly of FIG. 4, depicting the second blade assembly connected thereto.

Continuing now to the embodiment depicted in FIGS. 4-6, the string trimmer 200 and guard assembly 222 may include a first blade assembly 290 and a second blade assembly 294, operatively connected to the string trimmer 200 to facilitate cutting operations. Similar to the previous disclosed embodiment, the guard assembly 222 may be configured with an oblong shaped structure and a seam formed along the outer end, permitting the guard assembly to be easily removed from the string trimmer without removing the cutting head 220.

As illustrated in FIG. 5 the second blade assembly 294 is operatively connected to the string trimmer 200 by support 272. The deck portion 234 of the guard assembly 222 provides an aperture 282 configured to receive the support 272 therethrough. As depicted, the support 272 may be connected to the string trimmer support shaft 216 and motor case 218. It is contemplated that in alternative, embodiments, the support 272 may be connected directly to the motor case 218 or may be connected directly to the support shaft 216. In this manner, the support 272 extends generally downward therefrom, with a second blade 298 connected thereto. When the guard assemble 222 is mounted on the motor case 218, the support 272 extends through the aperture 282. As such, the cutting edge of the second blade 298 is positioned transverse to the string cutting element and also extends generally vertically, within the skirt member 240. As shown, the first blade 296, and second blade 298 may coexisted within the skirt member 240, providing dual cutting surfaces. In this way, if a user were to remove the guard assembly 222, and with it the first blade 296, the second blade 298 would still be positioned on the string trimmer to prevent the cutting element from becoming too long.

Similar to the first blade 296, the second blade 298 may be inwardly disposed in a radially direction from skirt member 240 forming a gap between the blade 298 and the skirt member 240. The gap permits air to flow between the blade 298 and the skirt member 240 preventing slack in the string cutting element. Additionally, while the blade 298 is shown as straight, one skilled in the art will appreciate it may take other forms, such as slanted or curved. Additionally, the radial distances of the first blade 296 and the second blade 298 can be the same or different. If the same, the length of the cutting element 50 would be identical regardless of whether the guard assembly were in place. However, if different, with the radial distance of the second blade 298 greater than first blade 296, removing the guard assembly would allow the user to select a cutting element 50 length based on the radius of the second blade 298.

Similar to the aforementioned embodiments, it is contemplated that the guard assembly 222 may be configured with a first seam 166, which permits the guard assembly 222 to be easily removed and attached to the motor case 218. It is further contemplated that the guard assembly 222 may also be configured as a half-oblong structure (similar to FIG. 9), which permit the guard assembly 222 to be easily removed from the motor case 218.

Figures 7A, 7B:
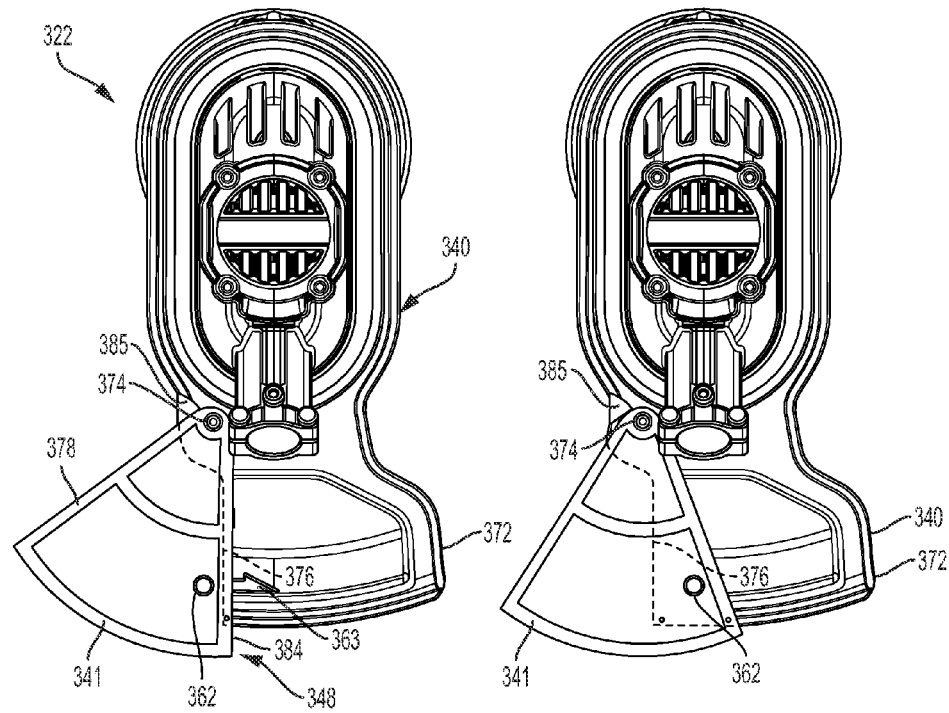
FIG. 7A is a top view of an embodiment of the string trimmer guard assembly having a first skirt member and, a pivotable second skirt member in an open position.
FIG. 7B is a top view of the string trimmer guard assembly of FIG. 7A, having the second skirt member in a retracted position.

In yet another embodiment shown in FIGS. 7A and 7B, the string trimmer guard assembly 322 may further include a fixed first skirt member 340 and a pivotable second skirt member 341, pivotally connected to the first skirt member 340. As such, the first skirt member 340 and second skirt member 341 may combine to form a third skirt member 348 having an enhanced shielding width for additional protection to the user. The user may adjust the overall width of the third skirt member 348 by activating a locking mechanism, such as a fastener or screw member 362, or similar type of engaging feature capable of locking and unlocking the first skirt member 340 and the second skirt member 341 together.

As shown the fastener 362 engages a slot 363 provided in the first skirt member 340. By removing the fastener 362, the fastener disengages the first skirt member 340 and the pivotable second skirt member 341, such that the pivotable second skirt member 341 is free to move about the pivot point 374, and the fastener 362 slides about the slot 363. To lock the pivotable second skirt member 341 at a selected position relative to the first skirt member 340, the user may insert the fastener 362, thereby causing the fastener to reengage the first skirt member 340 and second skirt member 341.

As shown in FIG. 7A, the fixed first skirt member 340 and second pivotable skirt member 341 are operatively connected at pivot member 374, which may be a fastener or screw, for example. The fixed skirt member 340 generally includes a first outer edge 372 and a second outer edge 376 configured for engagement with the pivotable second member 341 to limit the rotation of the second pivotable skirt member 341. Further, the pivotable second skirt member 341 generally includes a first outer edge 384, configured for engagement with the first outer edge 372 and a second outer edge 378.

In a fully protracted position, the first outer edge 384 of the pivotable second skirt member 341 engages the second outer edge 376 of the first skirt member 340 and is locked in place by the fastener 362 provided generally at the outer edge 384 of the second skirt member 341. It is contemplated that the second skirt member 341 may be rotatably adjusted by removing the fastener 362, and rotating the second member 341 into a selected position. It is contemplated that a stop structure 385 may be provided generally on the guard assembly 322 to engage the outer edge 378, thus preventing the second skirt member 341 from rotating beyond the edge 376 of the second skirt member 340.

In a retracted position, the pivotable skirt member 341 may be adjusted to reduce the overall size of the guard. As such, the pivotable skirt member 341 and the fixed skirt member 340 are adjusted into a substantially overlapping configuration, as shown in FIG. 7B.

Similar to the aforementioned embodiments, it is contemplated that the guard assembly 322 may be configured with a first seam 166, which permits the guard assembly 322 to be easily removed and attached to the motor case 118. It is further contemplated that the guard assembly 322 may also be configured as a half-oblong structure (similar to FIG. 9), which permit the guard assembly 322 to be easily removed from the motor case 118.

Figures 8A, 8B:
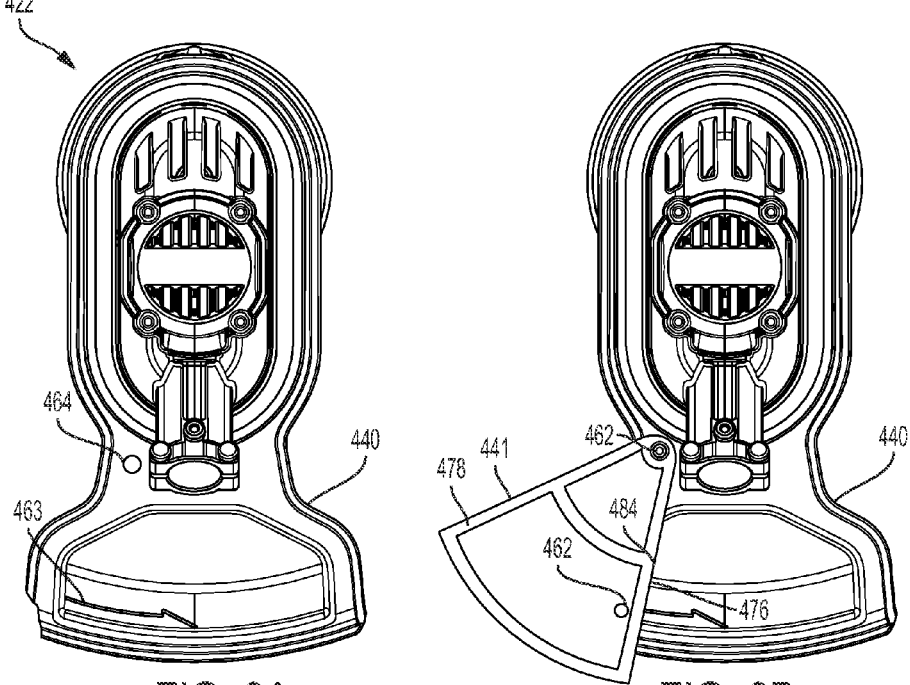
FIG. 8A is a top view of an embodiment of the string trimmer guard assembly having a first skirt member.
FIG. 8B is a top view of the string trimmer guard assembly of FIG. 8A, having a second skirt member removably connected to the side of the first skirt member; and, FIG. 9 is a perspective view of the string trimmer guard assembly illustrating a removable configuration.

In yet another embodiment shown in FIGS. 8A and 8B, the guard assembly 422 may be configured to include a fixed first skirt member 440 and a second attachable skirt member 441. As shown, the second skirt member 441 extends radially outward providing an inner edge 476 and an outer edge 478. The second skirt member 441 has fasteners 462 extending through apertures (not shown) formed along a first edge 484, and one of the fasteners 462 is aligned with a slot 463 formed on outer edge 478 of the first skirt member 440 and the other fastener 462 is inserted into an aperture 464 on the fixed first skirt member 440.

The first skirt member 440 and second skirt member 441 may be combined to increase shielding width of the guard assembly 422. The second skirt member 441 may be connected to the first skirt member 440 using the fastener 462, or a similar type of connecting feature capable of locking and unlocking the first skirt member 440 and the second skirt member 441 together.

As shown, one fastener 462 may engage the slot 463 provided on the first skirt member 440. To lock the second skirt member 441 at a selected position relative to the first skirt member 440, the user may place the second skirt member 441 at a selected location relative to the first skirt member 440 and then insert the fastener 462 into the slot 463 formed on the first skirt member 440. The user inserts the fastener 462, into the slot 463 thus locking the members 440 and 441 together.

To release the second skirt member 441 from the first skirt member 440, the user removes the fasteners 462. As such, the second skirt member 441 is detachable from the first skirt member 440.

Similar to the aforementioned embodiments, it is contemplated that the guard assembly 422 may be configured with a first seam 166, which permits the guard assembly 422 to be easily removed and attached to the motor case 118. It is further contemplated that the guard assembly 422 may also be configured as a half-oblong structure (similar to FIG. 9), which permit the guard assembly 422 to be easily removed from the motor case 118. A number of embodiments of the present invention have been described. Nevertheless, it will be understood that various modifications may be made without departing from the spirit and scope of the invention. Accordingly, other embodiments are within the scope of the following claims.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A removable guard assembly for a string trimmer, comprising; a housing, the housing having a mounting portion having an opening formed therein, a deck portion extending from the mounting portion, the deck portion having a proximal end and a distal end, and a first skirt member extending downward from the distal end of the deck portion, the mounting portion including a substantially flat support surface configured to support a portion of a bottom surface of a head assembly of the string trimmer; a blade provided in an interior of the first skirt member to engage a rotating string member, wherein the mounting portion has a seam formed thereon to permit the mounting portion to be separated and remove the removable guard assembly from the string trimmer.

2. The guard assembly of claim 1, wherein the mounting portion includes two adjacent surfaces that define the seam lie and each of the adjacent surfaces are substantially flat.

3. The guard assembly of claim 1, wherein the mounting portion includes a reinforcement rim that defines a portion of the seam, and the seam separates the reinforcement rim so that the opening can be accessed, permitting the guard assembly to be removed from a motor case without removing a cutting head.

4. The guard assembly of claim 1, wherein the deck portion includes an aperture configured to receive a second blade assembly of the string trimmer.

5. The guard assembly of claim 1, further comprising a second skirt member operatively engaged with the first skirt member.

6. The guard assembly of claim 5, wherein the operative engagement between the first and second skirt members defines a pivot point that facilitates pivotable movement of the second skirt member from an extended position to a retracted position, relative to the first skirt member.

7. The guard assembly of claim 5, wherein the operative engagement between the first and second skirt members is a removable connection, such that in a connected position, the first skirt member and second skirt member form a third skirt member.

8. The guard assembly of claim 1, wherein the mounting portion, deck portion and skirt member are made of a single unitary element.

9. The guard assembly of claim 1, wherein the mounting portion is made of a flexible resilient material allowing the mounting portion to return to its non-separated position.

10. An assembly comprising:
a head assembly on a distal end of a support shaft and a handle assembly on a proximal end of the support shaft, the head assembly having a motor casing enclosing a motor and a rotary head operatively connected to the motor;
a guard assembly having mounting portion having an opening formed therein, a deck portion extending from the mounting portion, a skirt member extending downward from an end of the deck portion; and
a blade provided in the interior of the skirt member to engage a rotating string member;
wherein the mounting portion fully encloses and is removably secured to the head assembly, the mounting portion including a seam, the seam allowing the mounting portion to be separated and remove the guard assembly from the head assembly; and
wherein the mounting portion, deck portion and skirt member are formed as a single unitary element.

11. The string trimmer of claim 10, wherein the mounting portion includes two adjacent surfaces that define the seam lie and each of the adjacent surfaces are substantially flat.

12. The string trimmer of claim 10, wherein the mounting portion is made of a flexible resilient material allowing the mounting portion to return to its non-separated position.

13. The string trimmer of claim 10, wherein the mounting portion includes a reinforcement rim around a perimeter of the opening, the seam separates the reinforcement rim so that the opening can be accessed, permitting the guard assembly to be removed from the motor case without removing the cutting head.

* * * * *